US007260388B1

(12) United States Patent
Myers

(10) Patent No.: US 7,260,388 B1
(45) Date of Patent: Aug. 21, 2007

(54) COMMUNICATION DEVICE QUALIFICATION FOR BROADBAND WIRELESS SERVICE

(75) Inventor: Steven Duane Myers, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1218 days.

(21) Appl. No.: 09/839,009

(22) Filed: Apr. 20, 2001

(51) Int. Cl.
*H04M 3/00* (2006.01)

(52) U.S. Cl. ....................... 455/419; 455/418; 455/424

(58) Field of Classification Search ................ 455/450, 455/452.2, 434, 428, 436; 370/316, 323, 370/325, 422, 328, 68.1, 110.1
See application file for complete search history.

(56) References Cited

U.S. PATENT DOCUMENTS 5,924,026 A * 7/1999 Krishnan ................. 455/414.1
6,151,309 A * 11/2000 Busuioc et al. ............. 370/328
6,275,692 B1 * 8/2001 Skog ....................... 455/414.3
6,415,131 B1 * 7/2002 Shohara ......................... 455/1
6,463,142 B1 * 10/2002 Kilp ....................... 379/201.06
6,529,936 B1 * 3/2003 Mayo et al. ................ 709/202
6,600,917 B1 * 7/2003 Maupin ................... 455/414.1
6,609,002 B1 * 8/2003 Krishnamurthy et al. ... 455/428
6,631,261 B1 * 10/2003 Farber ..................... 455/432.1
6,643,495 B1 * 11/2003 Gallery et al. ............. 455/3.06
2002/0120713 A1 * 8/2002 Gupta et al. ................ 709/217

* cited by examiner

*Primary Examiner*—Temica Beamer

(57) ABSTRACT

A software product for qualifying communication devices for a broadband wireless service is disclosed. The software product first identifies requirements of the broadband wireless service. Examples of the requirements include hardware and software requirements for a communication device to receive the broadband wireless service. The software product then executes an application to determine configuration information for a communication device. Configuration information, for example, is information on the CPU, the operating system, the amount of RAM, available hard disk space, an Ethernet connection, and a CD ROM drive of the communication device. The software product then compares the configuration information to the requirements of the broadband wireless service to determine if the communication device is configured to receive the broadband wireless service. Advantageously, the software product automatically determines if a communication device can receive a broadband wireless service.

28 Claims, 9 Drawing Sheets

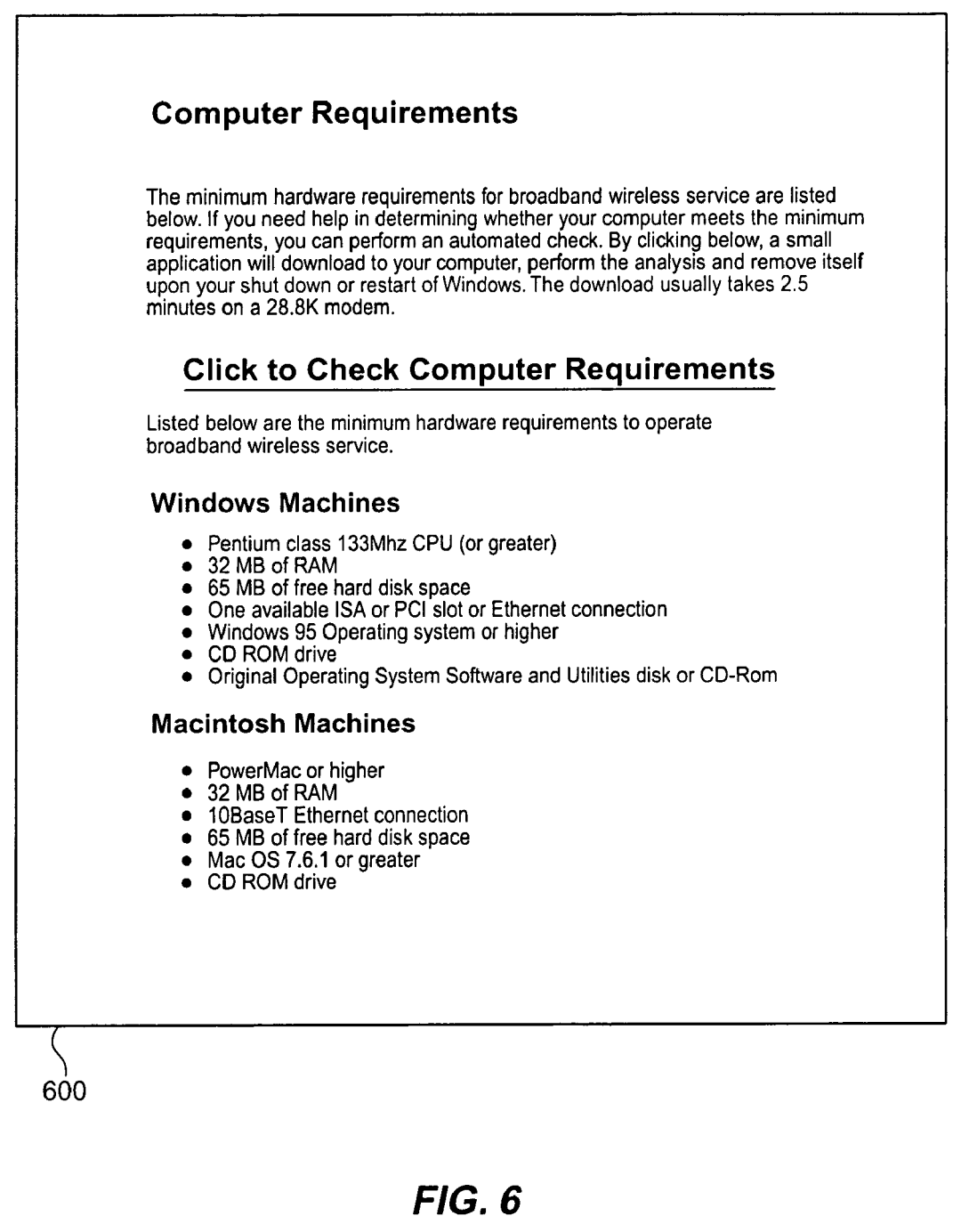

Computer Requirements

The minimum hardware requirements for broadband wireless service are listed below. If you need help in determining whether your computer meets the minimum requirements, you can perform an automated check. By clicking below, a small application will download to your computer, perform the analysis and remove itself upon your shut down or restart of Windows. The download usually takes 2.5 minutes on a 28.8K modem.

Click to Check Computer Requirements

Listed below are the minimum hardware requirements to operate broadband wireless service.

Windows Machines

- Pentium class 133Mhz CPU (or greater)
- 32 MB of RAM
- 65 MB of free hard disk space
- One available ISA or PCI slot or Ethernet connection
- Windows 95 Operating system or higher
- CD ROM drive
- Original Operating System Software and Utilities disk or CD-Rom

Macintosh Machines

- PowerMac or higher
- 32 MB of RAM
- 10BaseT Ethernet connection
- 65 MB of free hard disk space
- Mac OS 7.6.1 or greater
- CD ROM drive

600

*FIG. 6*

Congratulations! Your computer meets the recommended requirements for broadband wireless service.

| Category | Your PC | Minimum Requirements | Meets? | Recommended Requirements | Meets? |
|---|---|---|---|---|---|
| CPU | AMD K6-2 350 MHz | Pentium class 133Mhz CPU | ✓ | Pentium class 200Mhz CPU | ✓ |
| Operating System | Windows 95B | Windows 95 | ✓ | Windows 95/98/2000/NT | ✓ |
| RAM | 192 MB | 32 MB of RAM | ✓ | 64 MB of RAM | ✓ |
| Hard Disk Space | 5329 MB | 65 MB of free hard disk space | ✓ | 100 MB of free hard disk space | ✓ |
| Ethernet Connection | yes | Ethernet Connection or available ISA/PCI Slot | ✓ | Ethernet Connection or available ISA/PCI Slot | ✓ |
| CD ROM drive | yes | CD ROM drive | ✓ | CD ROM drive or DVD | ✓ |

900

*FIG. 9*

COMMUNICATION DEVICE QUALIFICATION FOR BROADBAND WIRELESS SERVICE

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communication systems, and in particular, to communication device qualification for broadband wireless service.

2. Description of the Prior Art

With the advent of the Internet, many products and services are available online. A computer can download files through a variety of web sites. A file can include programs, games, and other software. Sometimes the computer may not be adequately configured to download or run a file. For instance, a computer that does not have audio software may not be able to play a downloaded music file. A computer with a slow modem may not be able to download a live video feed. Unfortunately, some computer users may not know how their computer is configured and whether they can download and run a file.

Some software programs are able to determine the configuration of a computer. The computer runs the software program, which queries the processor for configuration information. The software program then displays the configuration information. The computer user can then determine if he/she can download or run a file. Software programs like this are available online. To evaluate the configuration of a computer, the software program transmits an applet to the computer. The applet is a stand-alone application. The computer executes the application to determine its own configuration. The computer then displays the configuration information to the computer user. One example of a software program that determines the configuration of a computer is software from MacAfee.com Corp.

Unfortunately, the current software programs do not compare the configuration information for a computer to a set of requirements. For instance, the set of requirements could be a minimum CPU speed and a minimum amount of RAM to run a program. The computer user generally has to make the comparison, which is inconvenient and time consuming.

Communication providers are constantly looking for faster and more reliable communication services for their customers. That way, the computer user can more efficiently surf the web and download files. One type of communication service is broadband wireless service. Broadband service generally refers to service with a bandwidth of at least 64 kbps. Broadband wireless service may require the customers have higher-performance computers. The customers seeking to get the broadband wireless service may not know if their computer is adequately configured for the service. As stated above, software programs do exist that determine the configuration of a computer. Unfortunately, the current software programs have not been effectively adapted to determine the configuration of a computer for the purpose of broadband wireless service.

SUMMARY OF THE INVENTION

The invention solves the above problems by determining if a communication device is qualified to receive a broadband wireless service. Advantageously, the invention automatically determines the configuration of a communication device and if the communication device is qualified to receive a broadband wireless service. The invention saves the customer time, and can avoid confusion as to whether the customer can receive a broadband wireless service.

In a first aspect of the invention, one or more processors execute qualification software to determine if a communication device is qualified to receive a broadband wireless service. To start, the qualification software is configured to direct the processors to identify requirements of a broadband wireless service. Requirements of the broadband wireless service may include hardware and software requirements for a communication device to receive the broadband wireless service. The qualification software is configured to direct the processors to execute an application to determine configuration information for a communication device. The qualification software is configured to direct the processors to compare the configuration information to the requirements of the broadband wireless service to determine if the communication device is qualified to receive the broadband wireless service.

In a second aspect of the invention, a communication device qualification system is configured to determine if a communication device is qualified to receive a broadband wireless service. The communication device qualification system is comprised of a processing system and an interface. The processing system is configured to identify requirements of a broadband wireless service. The processing system is configured to transmit an application to the interface. The application, when executed by a processor, is configured to determine configuration information for a communication device. The interface is configured to transmit the application to a communication device. The interface is configured to receive the configuration information from the communication device and transfer the configuration information to the processing system. The processing system is configured to compare the configuration information to the requirements of the broadband wireless service to determine if the communication device is qualified to receive the broadband wireless service.

In a third aspect of the invention, a broadband wireless service provider determines if a computer from a potential customer is qualified to receive a broadband wireless service. The broadband wireless service provider identifies requirements of the broadband wireless service. The broadband wireless service provider transmits an application to the potential customer's computer to determine configuration information for the computer. The broadband wireless service provider compares the configuration information to the requirements of the broadband wireless service. The broadband wireless service provider generates results based on the comparison, and formats the results, the configuration information, and the requirements of the broadband wireless service in HTTP format. The customer can then view the results using a web browser.

In a fourth aspect of the invention, the broadband wireless service provider identifies the requirements of the broadband wireless service. The broadband wireless service provider transmits an application and the requirements to the potential customer. The potential customer's computer runs the application to determine configuration information for the computer. The potential customer's computer compares the configuration information to the requirements of the broadband wireless service. The potential customer's computer generates results based on the comparison, and formats the results, the configuration information, and the requirements of the broadband wireless service in HTTP format. The customer can then view the results using a web browser.

BRIEF DESCRIPTION OF THE DRAWINGS

FIG. 6 shows a web page in an example of the invention.

FIG. 9 shows a web page in an example of the invention.

DETAILED DESCRIPTION OF THE INVENTION

Figure 1:
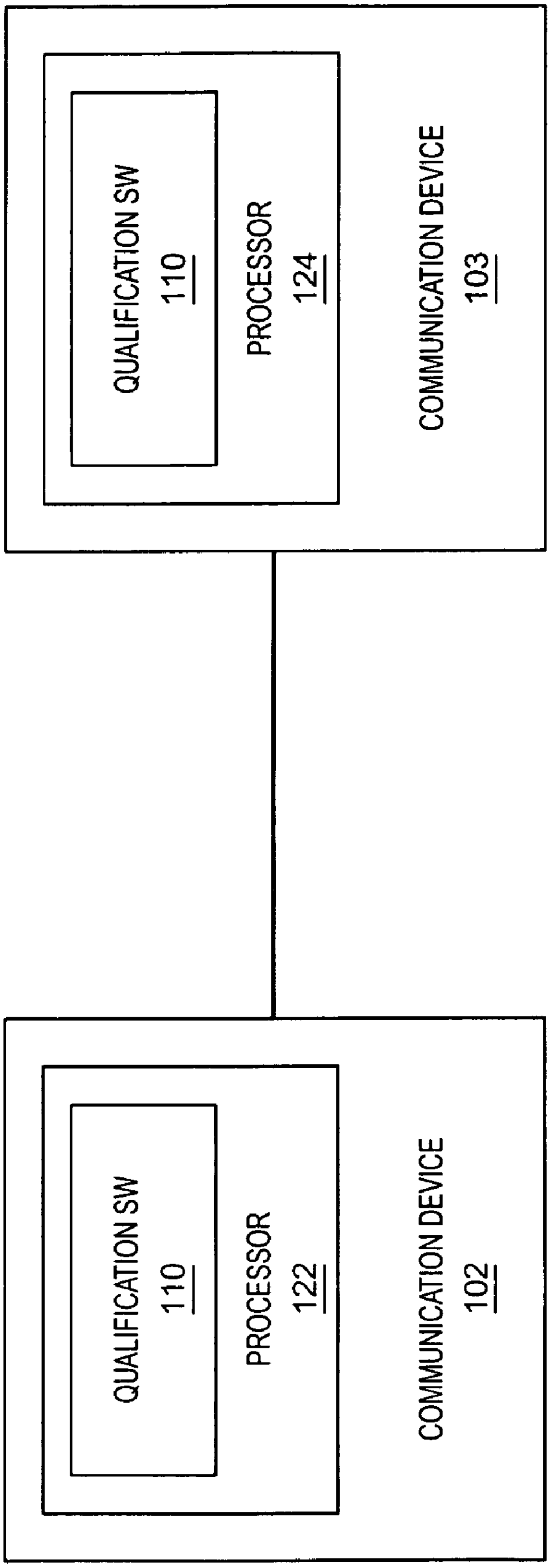
FIG. 1 is a block diagram that depicts communication devices executing qualification software in an example of the invention.
Figure 2:
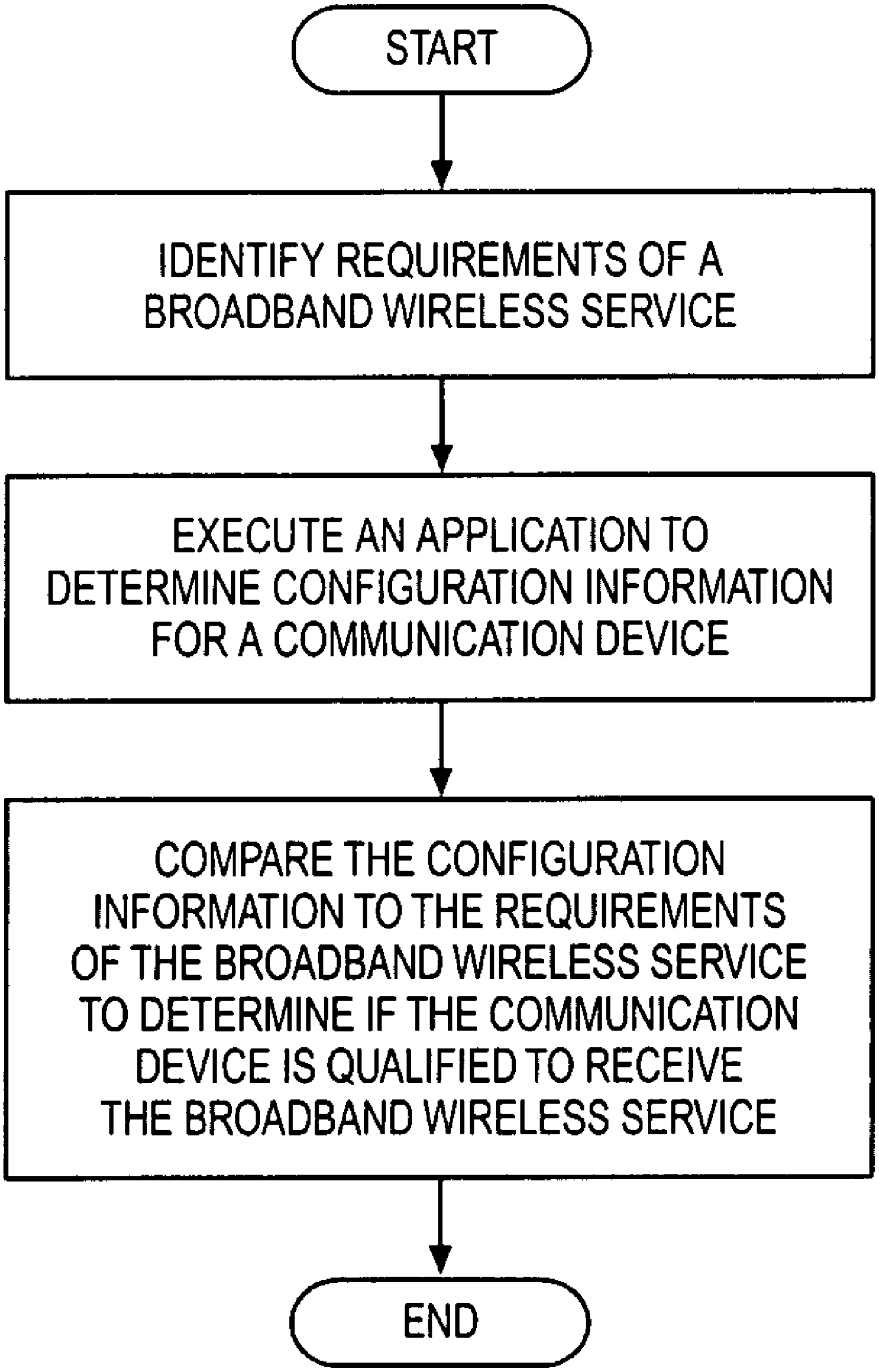
FIG. 2 is a flow diagram of the qualification software of FIG. 1 in an example of the invention.

Qualification for Broadband Wireless Service—FIGS. 1-2

FIGS. 1-2 depict a specific example of qualification software in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 1-2 have been simplified or omitted for clarity.

FIG. 1 is a block diagram that depicts communication devices 102-103 executing qualification software 110 in an example of the invention. Communication device 102 comprises a processor 122. Processor 122 is configured to execute qualification software 110. Communication device 103 comprises a processor 124. Processor 124 is configured to execute qualification software 110.

FIG. 2 is a flow diagram of qualification software 110 in an example of the invention. Those skilled in the art will appreciate that processor 122 and/or processor 124 could execute qualification software 110 to perform the operations in FIG. 2. Qualification software 110 directs processor 122 and/or processor 124 to identify requirements of a broadband wireless service. A broadband wireless service is any wireless service with a bandwidth of at least 64 kbps. Requirements of the broadband wireless service may include hardware and software requirements for a communication device to receive the broadband wireless service. Qualification software 110 directs processor 122 and/or processor 124 to execute an application to determine configuration information for a communication device. Configuration information for a communication device may include hardware and software configurations of the communication device. Qualification software 110 directs processor 122 and/or processor 124 to compare the configuration information to the requirements of the broadband wireless service. Based on the comparison, qualification software 110 directs processor 122 and/or processor 124 to determine if the communication device is qualified to receive the broadband wireless service.

Figure 3:
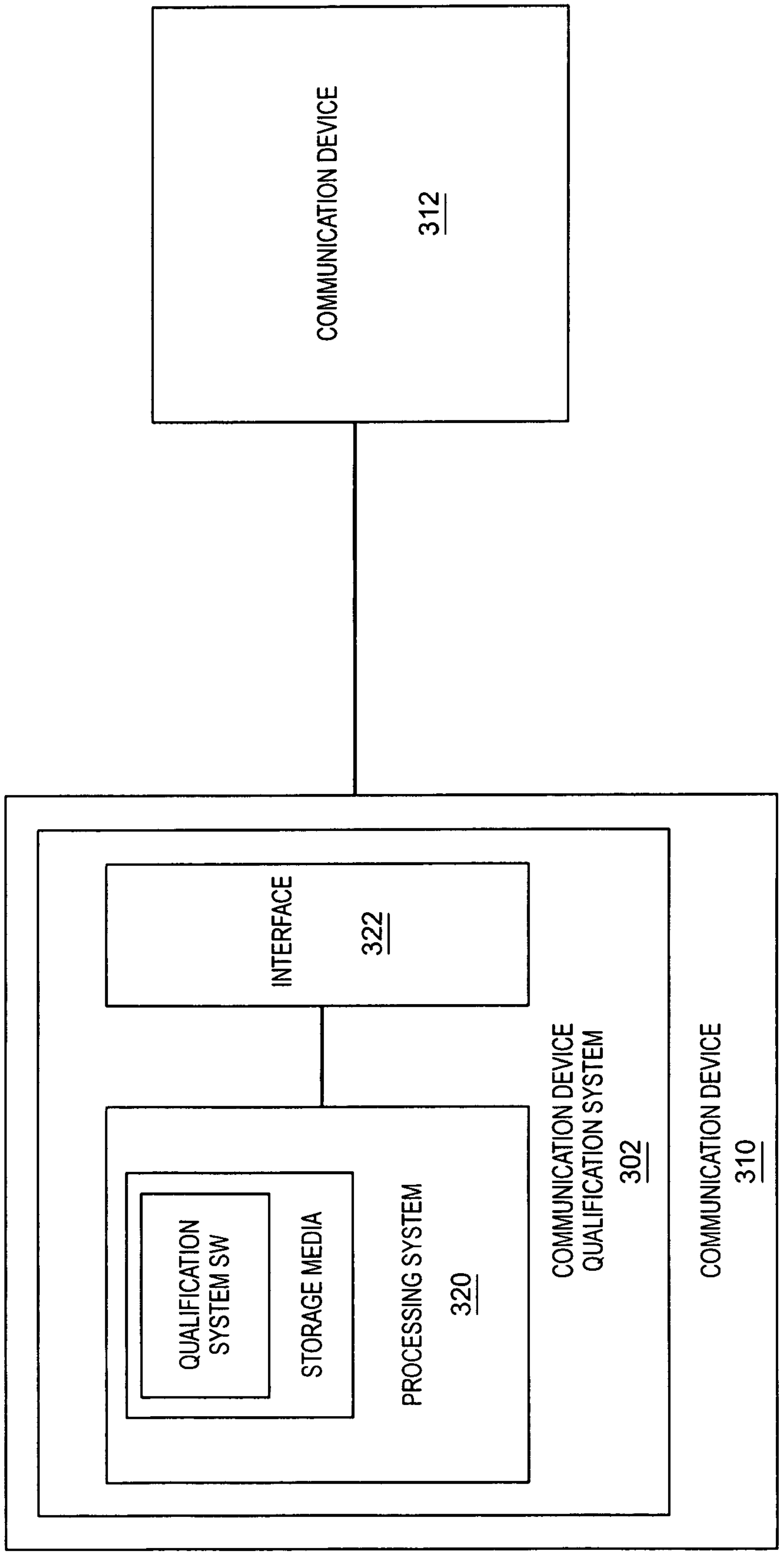
FIG. 3 is a block diagram that depicts a communication device qualification system in an example of the invention.
Figure 4:
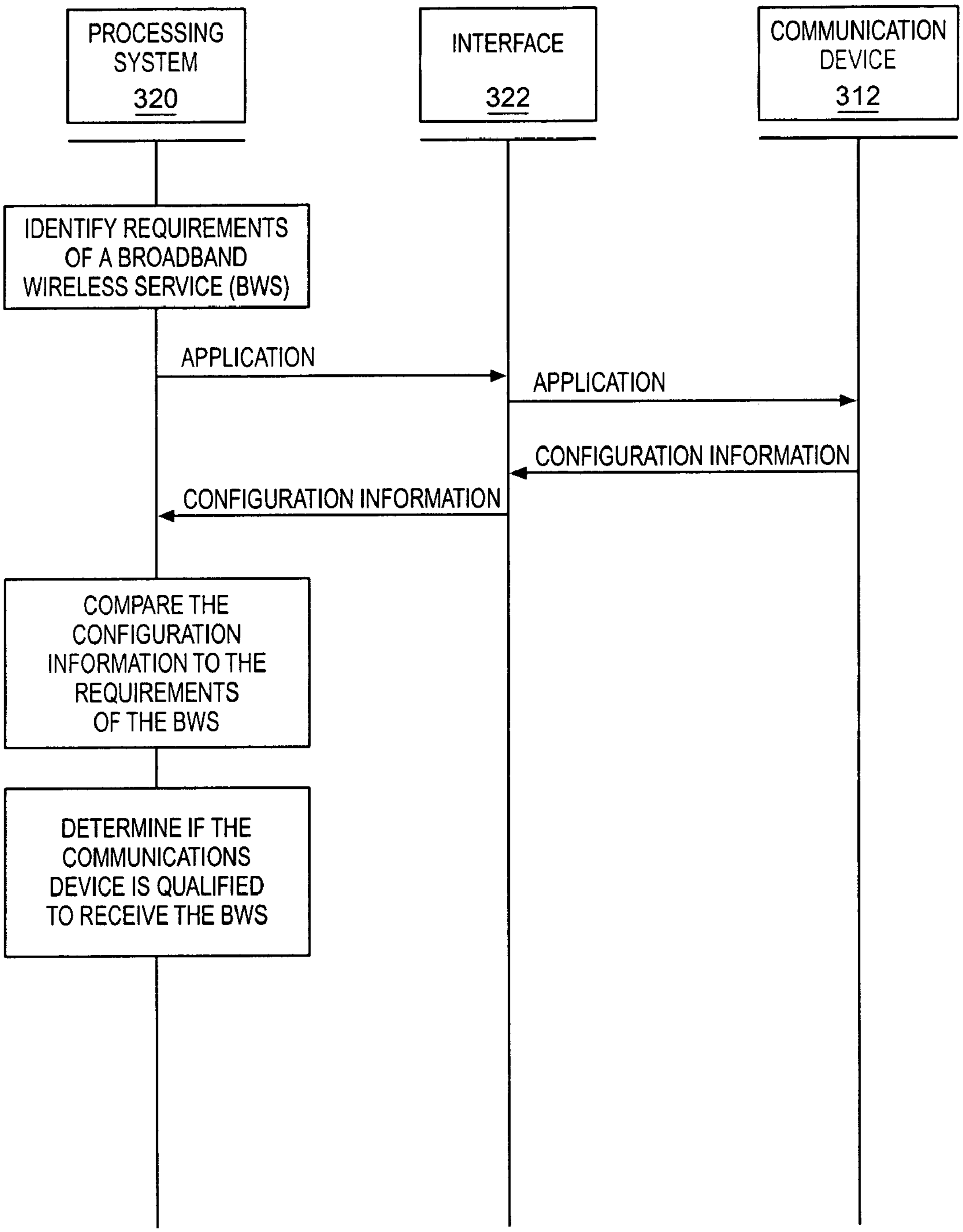
FIG. 4 is an operations sequence diagram for the communication device qualification system in FIG. 3 in an example of the invention.

Communication Device Qualification System—FIGS. 3-4

FIGS. 3-4 depict a specific example of a communication device qualification system in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 3-4 have been simplified or omitted for clarity.

FIG. 3 is a block diagram that depicts communication device qualification system 302 in an example of the invention. Communication device qualification system 302 is included within communication device 310. Communication device 310 is coupled to communication device 312. Communication device qualification system 302 comprises a processing system 320 and an interface 322. Processing system 320 is coupled to interface 322.

FIG. 4 is an operations sequence diagram for communication device qualification system 302 in an example of the invention. Processing system 320 identifies requirements of a broadband wireless service. A broadband wireless service is any wireless service with a bandwidth of at least 64 kbps. Requirements of the broadband wireless service may include hardware and software requirements for a communication device to receive the broadband wireless service. Processing system 320 transmits an application to interface 322. The application, when executed by a processor, is configured to determine configuration information for a communication device. Configuration information for a communication device may include hardware and software configurations of the communication device. Interface 322 transmits the application to communication device 312. Interface 322 receives the configuration information from communication device 312. Interface 322 transfers the configuration information to processing system 320. Processing system 320 compares the configuration information to the requirements of the broadband wireless service. Based on the comparison, processing system 320 determines if communication device 312 is qualified to receive the broadband wireless service.

Those skilled in the art will appreciate that the above-described communication device qualification system 302 could be comprised of instructions that are stored on storage media. The instructions can be retrieved and executed by a processor, such as processing system 320. Some examples of instructions are software, program code, and firmware. Some examples of storage media are memory devices, tape, disks, integrated circuits, and servers. The instructions are operational when executed by the processor to direct the processor to operate in accord with the invention. The term "processor" refers to a single processing device or a group of inter-operational processing devices. Some examples of processors are computers, integrated circuits, and logic circuitry. Those skilled in the art are familiar with instructions, processors, and storage media.

Qualification with a Broadband Wireless Service Provider—FIGS. 5-9

FIGS. 5-9 depict a specific example of a broadband wireless service provider qualifying customers in accord with the present invention. Those skilled in the art will appreciate numerous variations from this example that do not depart from the scope of the invention. Those skilled in the art will also appreciate that various features described below could be combined with other embodiments to form multiple variations of the invention. Those skilled in the art will appreciate that some conventional aspects of FIGS. 5-9 have been simplified or omitted for clarity.

Figure 5:
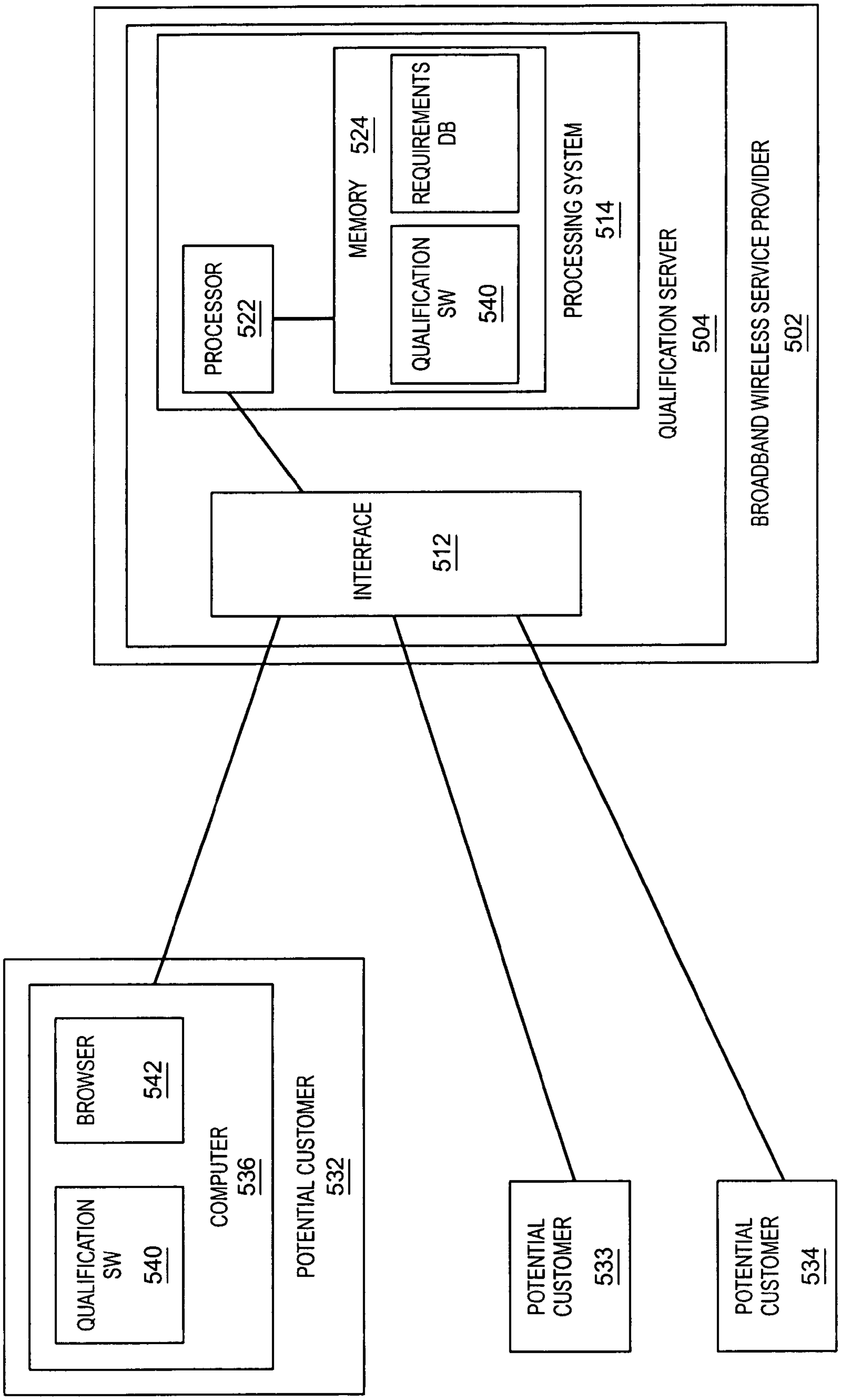
FIG. 5 is a block diagram that depicts a broadband wireless service provider configured to qualify potential customers for a broadband wireless service in an example of the invention.

FIG. 5 is a block diagram that depicts a broadband wireless service provider 502 in an example of the invention. Broadband wireless service provider 502 includes a qualification server 504. Qualification server 504 is comprised of an interface 512 and a processing system 514. Processing system 514 is comprised of processor 522 and memory 524. Broadband wireless service provider 502 is configured to communicate with potential customers 532-534. Potential customer 532 includes computer 536.

If potential customer 532 wants to receive a broadband wireless service offered by broadband wireless service provider 502, then potential customer 532 contacts broadband wireless service provider 502. Through qualification server 504, broadband wireless service provider 502 displays web pages that are accessible to potential customer 532 over the Internet. Potential customer 532 accesses the web pages using a browser 542. The broadband wireless service in this example could be a Multichannel Multipoint Distribution System (MMDS) service.

FIG. 6 shows a web page 600 in an example of the invention. Web page 600 displays some minimum requirements for potential customer 532 in order for potential customer 532 to receive the broadband wireless service. Web page 600 displays a link that allows potential customer 532 to check the computer requirements of computer 536. If potential customer 532 selects the computer requirements check link, then computer 536 interfaces with qualification server 504 to check the configuration of computer 536.

Figure 7:
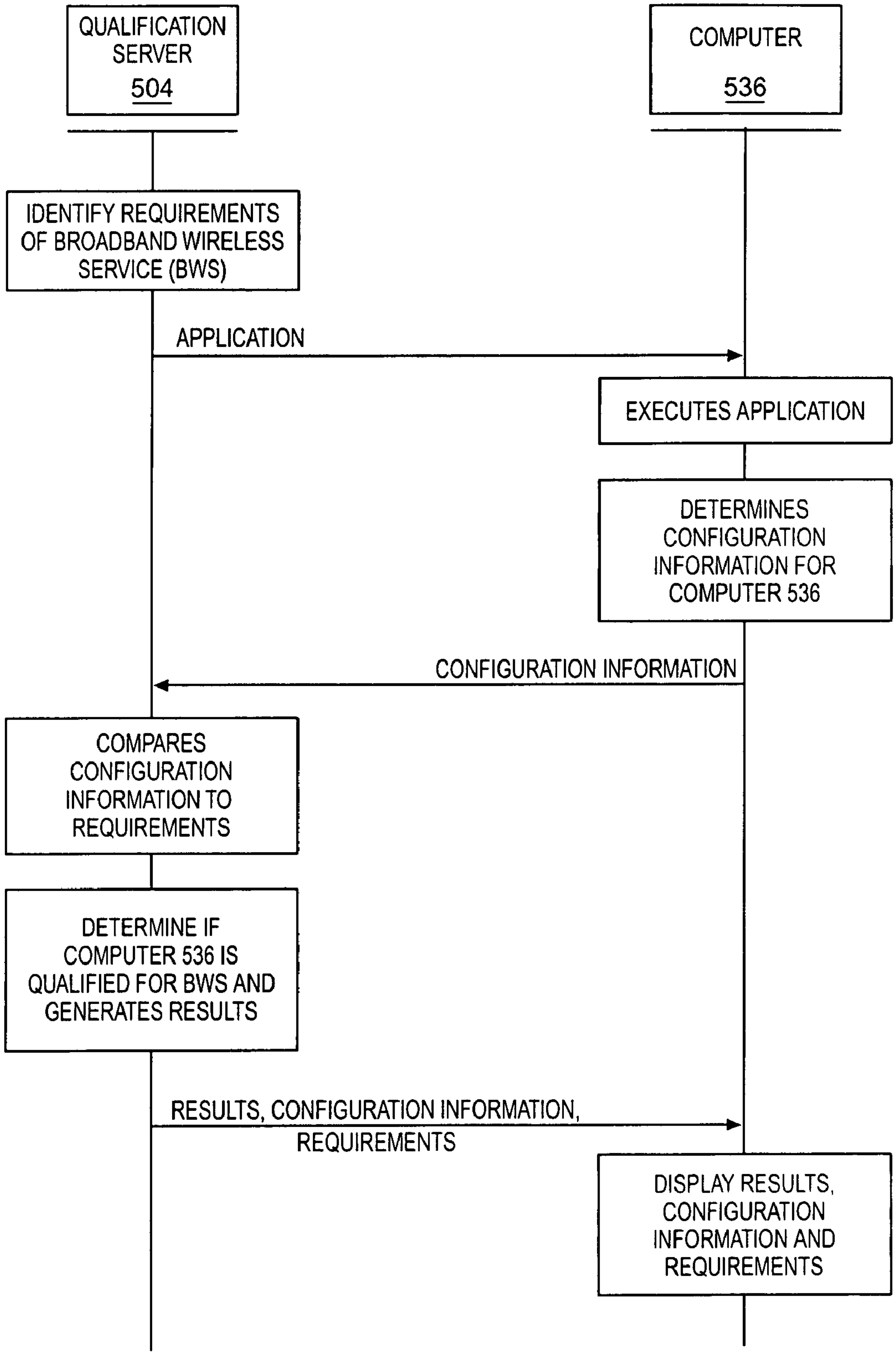
FIG. 7 is an operations sequence chart for executing qualification software in an example of the invention.

FIG. 7 is an operations sequence chart for executing qualification software in an example of the invention. Processor 522 executes qualification software 540 in response to potential customer 532 selecting the computer requirements check link. Through executing the qualification software, processor 522 identifies the requirements of the broadband wireless service offered by broadband wireless service provider 502. Processor 522 identifies the requirements by looking in a requirements database stored in memory 524. Processor 522 transmits an application to computer 536 through interface 512. The application is an applet, which is an application that performs a specific task. Computer 536 receives the application through browser 542. Computer 536 executes the application to determine configuration information for computer 536. Configuration information, for example, is information on the CPU, the operating system, the amount of RAM, available hard disk space, an Ethernet connection, and a CD ROM drive. Computer 536 transmits the configuration information to processor 522 through browser 542.

Processor 522 receives the configuration information through interface 512. Processor 522 compares the configuration information to the requirements of the broadband wireless service. Based on the comparison, processor 522 determines if computer 536 is qualified to receive the broadband wireless service. Processor 522 generates results based on the comparison. The results indicate if computer 536 is qualified to receive the broadband wireless service. Processor 522 formats the results, the configuration information, and the requirements based on HyperText Transfer Protocol (HTTP) format. Processor 522 transmits the results, the configuration information, and the requirements to computer 536 through interface 512. Browser 542 displays the results, the configuration information, and the requirements for potential customer 532.

Figure 8:
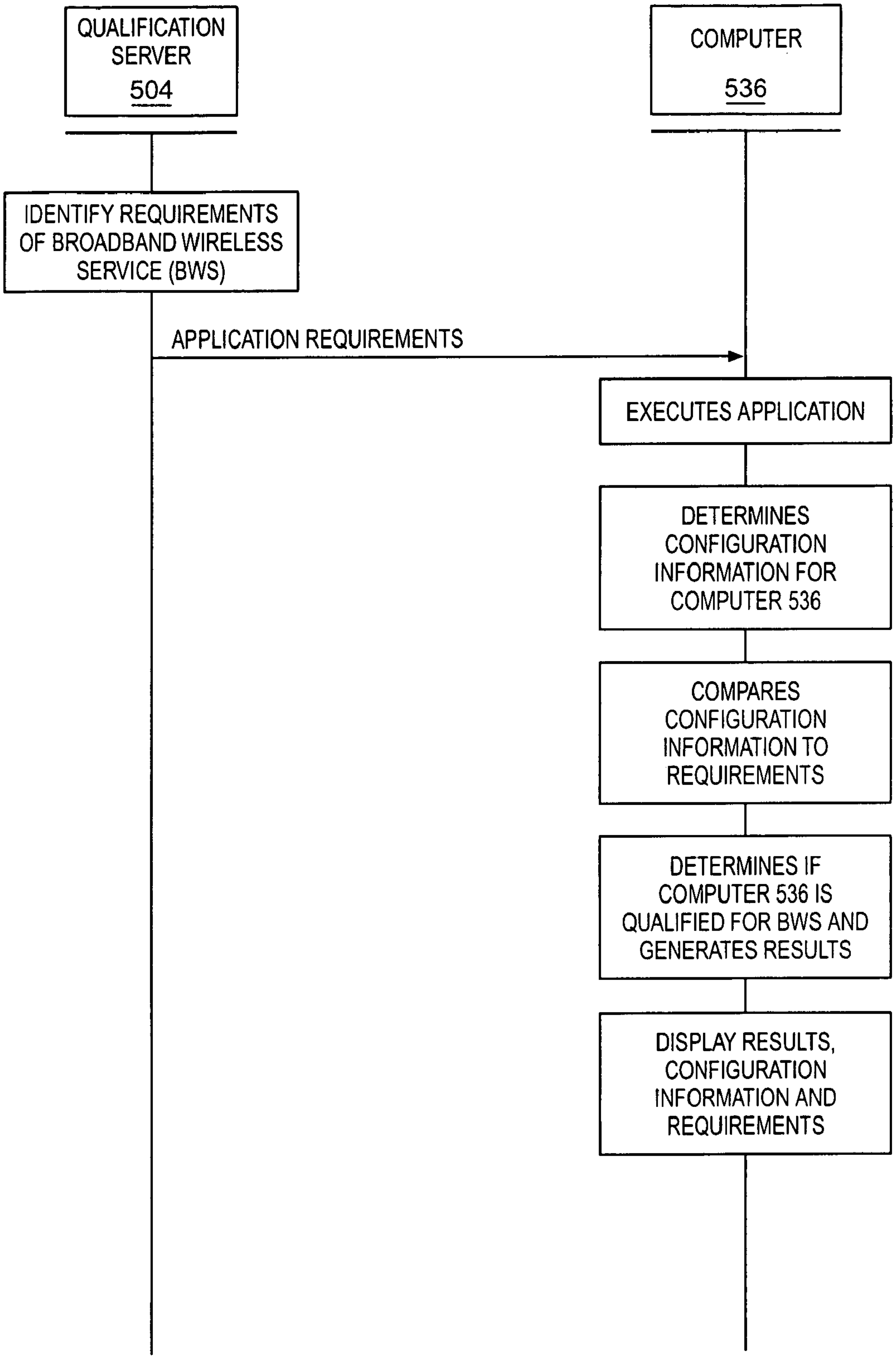
FIG. 8 is an operations sequence chart for executing qualification software in an example of the invention.

An alternative to the operations sequence chart for executing qualification software in FIG. 7 is shown in FIG. 8. Processor 522 executes qualification software in response to potential customer 532 selecting the computer requirements check link. Through executing the qualification software, processor 522 identifies the requirements of the broadband wireless service offered by broadband wireless service provider 502. Processor 522 identifies the requirements by looking in the requirements database stored in memory 524. Processor 522 transmits an application and the requirements to computer 536 through interface 512. The application is an applet. Computer 536 receives the application and the requirements through browser 542. Computer 536 executes the application to determine configuration information for computer 536. Configuration information, for example, is information on the CPU, the operating system, the amount of RAM, available hard disk space, an Ethernet connection, and a CD ROM drive.

Computer 536 compares the configuration information to the requirements of the broadband wireless service. Based on the comparison, computer 536 determines if computer 536 is qualified to receive the broadband wireless service. Computer 536 generates results based on the comparison. The results indicate if computer 536 is qualified to receive the broadband wireless service. Computer 536 formats the results, the configuration information, and the requirements based on HTTP format. Browser 542 displays the results, the configuration information, and the requirements for potential customer 532.

FIG. 9 shows a web page 900 in an example of the invention. Web page 900 displays an example of the results of the computer requirements check. Web page 900 indicates to potential customer 532 whether or not computer 536 meets the minimum requirements for the broadband wireless service. Web page 900 lists the minimum requirements and recommended requirements for the broadband wireless service. Web page 900 also lists the configuration information for computer 536, and how the configuration information relates to the minimum requirements and recommended requirements.

In the example shown in FIG. 9, computer 536 meets the minimum and recommended requirements of the broadband wireless service. Thus, potential customer 532 is qualified to receive MMDS service from broadband wireless service provider 502. Receiving MMDS service could involve interfacing computer 536 with an MMDS transceiver, a wireless broadband router, and other equipment.

Processor 522 also determines upgrades for the computer 536 based on the results of the computer requirements check. By comparing the configuration information for computer 536 with the minimum and recommended requirements of the broadband wireless service, processor 522 provides suggested upgrades to potential customer 532. The suggested upgrades could be to improve the performance of computer 536 for receiving the broadband wireless service. Processor 522 also determines business information for businesses that provide or sell the upgrades. The business information includes names, addresses, phone numbers, e-mail addresses, and Internet addresses. With this information, potential customer 532 can buy the suggested upgrades to improve computer 536 for the broadband wireless service.

Those skilled in the art will appreciate variations of the above-described embodiments that fall within the scope of the invention. As a result, the invention is not limited to the specific examples and illustrations discussed above, but only by the following claims and their equivalents.

I claim:

1. A software product for qualifying communication devices for broadband wireless services, the software product comprising:

qualification software configured when executed by at least one processor to direct the at least one processor to identify requirements of a broadband wireless service, execute an application to determine configuration information for a first communication device, and perform a comparison of the configuration information to the requirements of the broadband wireless service to determine if the first communication device is qualified to receive the broadband wireless service; and a software storage medium configured to store the qualification software.

2. The software product of claim 1 wherein a second communication device is configured to execute the qualification software to:

identify the requirements of the broadband wireless service;

transmit the application to the first communication device;

receive the configuration information from the first communication device; and perform the comparison to determine if the first communication device is qualified to receive the broadband wireless service.

3. The software product of claim 2 wherein the first communication device is configured to execute the qualification software to:

receive the application from the second communication device;

execute the application to determine the configuration information; and transmit the configuration information to the second communication device.

4. The software product of claim 3 wherein the second communication device is configured to execute the qualification software to:

generate results based on the comparison; and transmit the results, the configuration information, and the requirements to the first communication device for display by the first communication device.

5. The software product of claim 4 wherein a second communication device is configured to execute the qualification software to format the results, the configuration information, and the requirements based on HyperText Transfer Protocol (HTTP) format.

6. The software product of claim 1 wherein a second communication device is configured to execute the qualification software to:

identify the requirements of the broadband wireless service; and transmit the application and the requirements to the first communication device.

7. The software product of claim 6 wherein the first communication device is configured to execute the qualification software to;

receive the application and the requirements from the second communication device;

execute the application to determine the configuration information;

perform the comparison to determine if the first communication device is qualified to receive the broadband wireless service;

generate results based on the comparison; and display the results, the configuration information, and the requirements.

8. The software product of claim 7 wherein the first communication device is configured to execute the qualification software to format the results, the configuration information, and the requirements based on HyperText Transfer Protocol (HTTP) format.

9. The software product of claim 1 wherein the application comprises an applet.

10. The software product of claim 1 wherein the qualification software is further configured to direct the at least one processor to determine upgrades for the first communication device based on the comparison.

11. The software product of claim 10 wherein the qualification software is further configured to direct the at least one processor to determine business information for businesses that provide the upgrades.

12. A method of qualifying communication devices for broadband wireless services, the method comprising:

identifying requirements of a broadband wireless service;

executing an application to determine configuration information for a first communication device; and performing a comparison of the configuration information to the requirements of the broadband wireless service to determine if the first communication device is qualified to receive the broadband wireless service.

13. The method of claim 12 further comprising:

in a second communication device, identifying the requirements of the broadband wireless service;

transmitting the application to the first communication device;

receiving the configuration information from the first communication device; and performing the comparison to determine if the first communication device is qualified to receive the broadband wireless service.

14. The method of claim 13 further comprising:

in the first communication device, receiving the application from the second communication device;

executing the application to determine the configuration information; and transmitting the configuration information to the second communication device.

15. The method of claim 14 further comprising:

in the second communication device, generating results based on the comparison; and transmitting the results, the configuration information, and the requirements to the first communication device for display by the first communication device.

16. The method of claim 15 further comprising:

in the second communication device, formatting the results, the configuration information, and the requirements based on HyperText Transfer Protocol (HTTP) format.

17. The method of claim 12 further comprising:

in a second communication device, identifying the requirements of the broadband wireless service; and transmitting the application and the requirements of the broadband wireless service to the first communication device.

18. The method of claim 17 further comprising:
in the first communication device,
receiving the application and the requirements from the second communication device;
executing the application to determine the configuration information;
performing the comparison to determine if the first communication device is qualified to receive the broadband wireless service;
generating results based on the comparison; and
displaying the results, the configuration information, and the requirements.

19. The method of claim 18 further comprising:
in the first communication device, formatting the results, the configuration information, and the requirements based on HyperText Transfer Protocol (HTTP) format.

20. The method of claim 12 wherein the application comprises an applet.

21. The method of claim 12 further comprising determining upgrades for the first communication device based on the comparison.

22. The method of claim 21 further comprising determining business information for businesses that provide the upgrades.

23. A communication device qualification system, comprising:
a processing system configured to identify requirements of a broadband wireless service, transfer an application wherein the application is configured to determine configuration information for a first communication device, receive the configuration information, and perform a comparison of the configuration information to the requirements of the broadband wireless service to determine if the first communication device is qualified to receive the broadband wireless service; and
an interface configured to receive the application from the processing system, transmit the application to the first communication device, receive the configuration information from the first communication device, and transfer the configuration information to the processing system.

24. The communication device qualification system of claim 23 wherein the processing system is further configured to generate results based on the comparison and wherein the interface is further configured to transmit the results, the configuration information, and the requirements to the first communication device for display by the first communication device.

25. The communication device qualification system of claim 24 wherein the processing system is further configured to format the results, the configuration information, and the requirements based on HyperText Transfer Protocol (HTTP) format.

26. The communication device qualification system of claim 23 wherein the application comprises an applet.

27. The communication device qualification system of claim 23 wherein the processing system is further configured to determine upgrades for the communication device based on the comparison.

28. The communication device qualification system of claim 27 wherein the processing system is further configured to determine business information for businesses that provide the upgrades.

* * * * *